US008342992B2

United States Patent
Deno (10) Patent No.: US 8,342,992 B2
(45) Date of Patent: Jan. 1, 2013

(54) DRIVING FORCE TRANSMITTING APPARATUS

(75) Inventor: Kohei Deno, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 12/620,169

(22) Filed: Nov. 17, 2009

(65) Prior Publication Data

US 2010/0125015 A1    May 20, 2010

(30) Foreign Application Priority Data

Nov. 18, 2008 (JP) ................................. 2008-294591

(51) Int. Cl.
*F16H 9/00* (2006.01)

(52) U.S. Cl. .......................................... 474/73; 474/74
(58) Field of Classification Search ............... 474/72, 474/73, 74, 149

See application file for complete search history.

(56) References Cited

U.S. PATENT DOCUMENTS

| 3,837,231 A * | 9/1974 | Holmlund | 74/61 |
| 4,577,527 A * | 3/1986 | Shackelford | 74/640 |
| 7,243,575 B2 * | 7/2007 | Niederwimmer | 74/745 |
| 2010/0125015 A1 | 5/2010 | Deno | |
| 2011/0033206 A1 * | 2/2011 | Kitayama et al. | 399/167 |

FOREIGN PATENT DOCUMENTS

| JP | 09-114171 | 5/1997 |
| JP | 2000-034082 | 2/2000 |

* cited by examiner

*Primary Examiner* — Sang Kim (74) *Attorney, Agent, or Firm* — Fitzpatrick, Cella, Harper & Scinto (57) ABSTRACT

A drive transmission apparatus for transmitting a driving force to a rotatable member includes a driving source; a drive pulley for receiving a driving force from the driving source; a driven pulley; a belt, extending around the drive pulley and the driven pulley, for transmitting the driving force from the drive pulley to the driven pulley; and a driving gear for receiving a driving force from the driving source. The apparatus also includes a driven gear for receiving the driving force of the driving gear; a drive transmitting shaft, provided with the driven pulley and the driven gear, for transmitting the driving force to the rotatable member; and a drive transmission mechanism, provided between the driven gear and the drive transmitting shaft, for transmitting the driving force in a rotational direction from the driven gear to the drive transmitting shaft when an angular speed of the driven pulley is lower than an angular speed of the driven gear.

5 Claims, 9 Drawing Sheets

DRIVING FORCE TRANSMITTING APPARATUS

FIELD OF THE INVENTION AND RELATED ART

The present invention relates to a driving force transmitting apparatus which transmits rotational driving force from a driving force source to an object to be rotated.

One of the problems which has been attracting attention in the field of image forming apparatuses, for example, in the field of color copying machines, in recent years, is the formation of such abnormal images that are abnormal in that they suffer from nonuniformity in density, that is, the nonuniformity called banding, color deviation of the primary colors Y (yellow), M (magenta), C (cyan), and K (black), positional deviation, etc. One of the causes of these problems is that a photosensitive drum and/or a transfer belt becomes unstable in rotational speed while a toner image is formed on a photosensitive drum, while the toner image is transferred (primary transfer) from a photosensitive drum onto an intermediary transfer belt (which hereafter may be referred to simply as transfer belt), and/or while the toner image is transferred (secondary transfer) from the transfer belt onto a sheet of paper. In order to prevent the occurrence of these problems, it is required to highly precisely transmit the rotational force from a motor to the photosensitive drum and transfer belt, so that the photosensitive drum and transfer belt are precisely driven at a slower speed than the speed of the motor. One of the proposals made to satisfy this requirement is the belt driving mechanism, such as the one disclosed in Japanese Laid-open Patent Application H09-114171.

The belt-based driving force transmitting mechanism is such a driving force transmitting mechanism that is made up of a driver pulley, a follower pulley, and a metallic belt (steel belt), and is structured so that the metallic belt is wrapped around, being thereby stretched between, the driver pulley and follower pulley to transmit driving force from the driver pulley to the follower pulley, using the friction between the metallic belt and each of the two pulleys. It has been known that the belt-based driving force transmitting mechanism does not suffer from problems, such as "binding" or "locking up" which a gear-based driving force transmitting mechanism sometimes suffers, and also, that the belt-based driving force transmitting mechanism does not suffer from the rattling attributable to backlash. Further, a metallic belt is higher in rigidity, being therefore more resistant to tension, than a resin belt. Therefore, a metallic belt does not change in circumference as much as a resin belt, being therefore capable of more precisely transmitting driving force than a resin belt.

However, a friction-based driving force transmitting apparatus, such as the above described one which uses a steel belt, also has some problems. One of the problems is that slipping occurs between the pulley and belt. The slipping is more likely to occur when the driving apparatus is started or stationary than while the driving apparatus is driven at a low speed, and therefore, the belt speed is stable. Further, the higher the driving speed, the more likely to occur the slipping. There are two significant causes for the slipping. One is the changes in the amount of the load to which the driving force transmitting mechanism is subjected. The other is the changes in the state (condition) of the driving force transmitting apparatus. As an example of the former, increase in the amount of force (load) necessary to drive the rotational members, such as a photosensitive drum, may be listed. As for an example of the latter, soiling of the driving belt, may be listed. As for one of the conventional countermeasures for the slipping, it has been tried, for example, to increase the belt tension, and the angle by which the belt is wrapped around the pulleys.

However, the increase in belt tension results in the shortening of the service life of the belt. Further, from the standpoint of the size reduction of an image forming apparatus, and the greater speed reduction, the driver pulley needs to be made as small as possible. Therefore, in many cases, it is very difficult to make satisfactorily large the angle by which the belt is wrapped around the pulleys.

Thus, Japanese Laid-open Patent Application 2000-034082 discloses a method for watching for the occurrence of the belt slipping, and controlling the driving force transmitting apparatus, in anticipation of the belt slipping. More concretely, the rotational speed of the motor, and the rotational speed of the output side of the belt-based driving force transmitting apparatus, are detected, and the difference between the two numbers are compared to detect the amount of the slipping by making computations while taking into consideration the speed reduction ratio. Then, the results are reported to an operator, and the apparatus is checked, and an appropriate maintenance operation is carried out.

SUMMARY OF THE INVENTION

However, in the case of the method in Japanese Laid-open Patent Application 2000-034082, the occurrence of the slipping can be detected only after the slipping occurred by a certain amount. In other words, by the time the slipping is detected, the rotational members and/or driving mechanism will be in the abnormal condition. Further, as the slipping occurs, the difference between the pulley speed and belt speed suddenly increases, and therefore, it may be impossible to prevent the belt from being partially damaged by the friction between the pulleys and belt. That is, allowing the belt to slip may result in the formation of small cracks across the portion of the belt, which is in contact with the pulley. Thus, as the belt is repeatedly rotated, these cracks become larger, negatively affecting thereby the service life of the belt. That is, the belt may eventually break or split.

According to an aspect of the present invention, there is provided a drive transmission apparatus for transmitting a driving force to a rotatable member, said drive transmission apparatus comprising a driving source; a drive pulley for receiving a driving force from said driving source; a driven pulley; a belt, extending around said drive pulley and said driven pulley, for transmitting the driving force from said drive pulley to said driven pulley; a driving gear for receiving a driving force from said driving source; a driven gear for receiving the driving force of said driving gear; a drive transmitting shaft, provided with said driven pulley and said driven gear, for transmitting the driving force to said rotatable member; a drive transmission mechanism, provided between said driven gear and said drive transmitting shaft, for transmitting the driving force in a rotational direction from said driven gear to said drive transmitting shaft when an angular speed of said driven pulley is lower than an angular speed of said driven gear.

Therefore, it is possible to prevent the belt from being damaged by the slipping between the belt and the pulleys.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Hereinafter, the preferred embodiments of the present invention, which are in the form of an electrophotographic copying machine (which hereafter will be referred to simply as "copying machine") as an image forming apparatus, will be described. Incidentally, unless specifically stated, various structural features of a driving force transmitting apparatus in accordance with the present invention, which will be described hereafter, can replace various known structural features of the apparatuses similar in function to those in the preferred embodiments, within the scope of the present invention. The present invention is not intended to be applied only to the driving force transmitting apparatuses in the preferred embodiments of the present invention, which will be described next.

Embodiment 1

First, the general structure of the image forming apparatus in this embodiment will be described.

Figure 1:
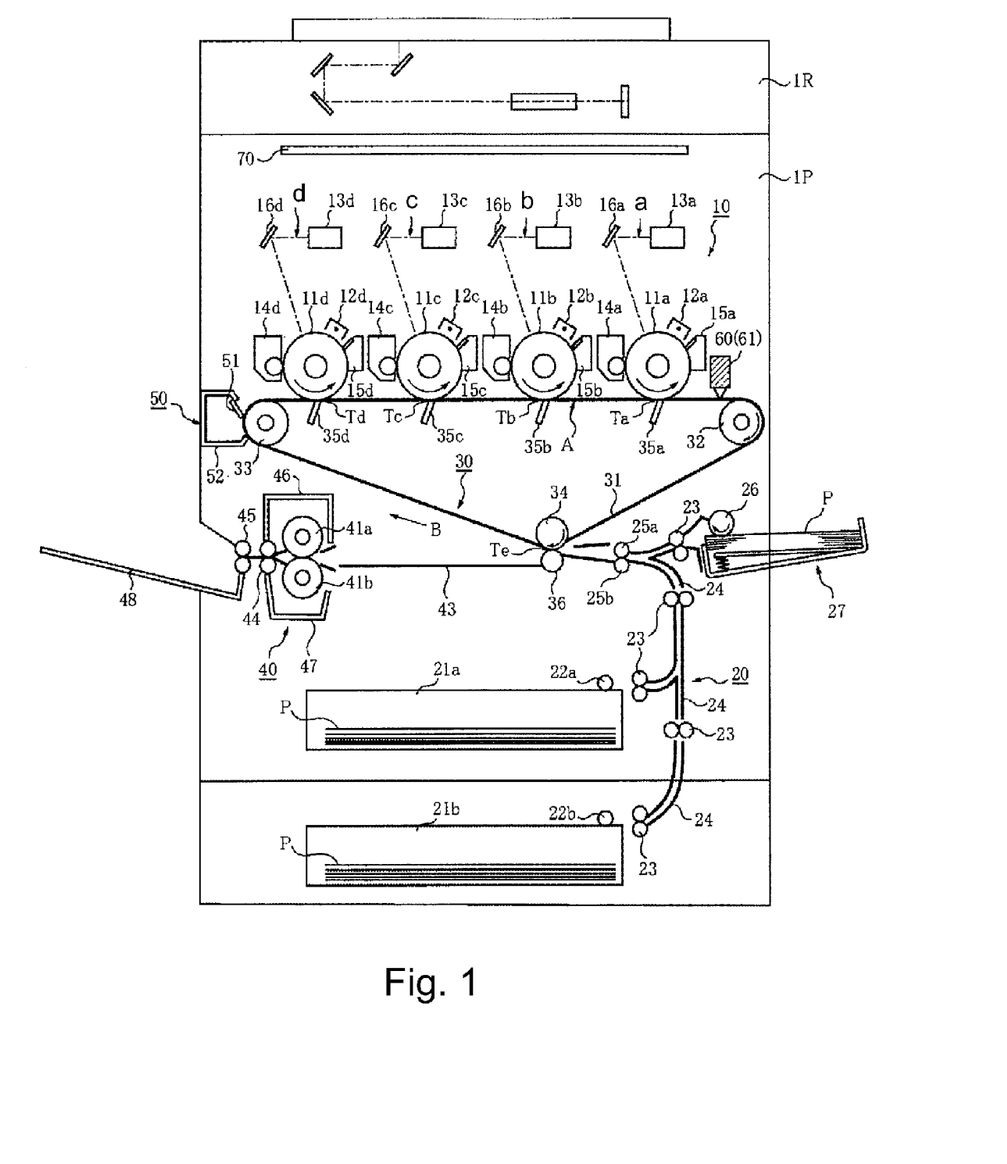
FIG. 1 is a sectional view of the image forming apparatus in the first preferred embodiment of the present invention, and is for describing the general structure of the apparatus.

FIG. 1 shows the image forming apparatuses in the first preferred embodiment of the present invention. The image forming apparatus shown in FIG. 1 is a full-color laser beam printer. It has four image formation stations, which are sequentially arranged in parallel, and uses an intermediary transfer method. It is based on four primary colors.

The image forming apparatus shown in FIG. 1 has a printer portion 1P and a reader portion 1R.

Roughly speaking, the printer portion 1P is made up of an image forming portion 10, a sheet feeding unit 20, an intermediary transfer unit 30, a fixation unit 40, and a controlling means. The image forming portion 10 has four image formation stations a, b, c, and d, which are the same in structure. Next, these portions will be described in detail.

The image forming portion 10 is structured as will be described next. Electrophotographic photosensitive members 11a, 11b, 11c, and 11d (which hereafter may be referred to as "photosensitive drum"), which are image bearing members and in the form of a drum. The photosensitive drums 11 are supported by their shafts, the axial line of which coincides with the axial line of the photosensitive drum. They are rotationally driven in the direction indicated by arrow marks. Disposed in the adjacencies of the peripheral surface of each photosensitive drum 11 are a primary charging device 12 (12a-12d), an exposing apparatus 13 (13a-13d), a deflection mirror 16 (16a-16d), and a developing device 14 (14a-14d), listing in the order in which they are disposed in terms of the rotational direction of the photosensitive drum 11. The peripheral surface of the photosensitive drum 11 (11a-11d) is uniformly charged by the primary charging device 12 (12a-12d) to preset polarity and potential level. After the charging of the peripheral surface of the photosensitive drum 11, an electrostatic image is formed on the peripheral surface of the photosensitive drum 11 (11a-11d) by exposing the charged portion of the peripheral surface of the photosensitive drum 11 to the beam of laser light outputted from the optical system 13 (13a-13d) while being modulated in response to recording image signal, and deflected by the mirror 16 (16a-16d). Then, toner is adhered to the abovementioned electrostatic image by the developing device 14 (14a-14d) which has one of four toners (developers), that is, yellow, magenta, cyan, or black toner. As a result, the electrostatic images are developed into images formed of toner (which hereafter will be referred to as "toner images"). The toner images are transferred onto an intermediary transfer belt 31 in the primary transfer areas Ta, Tb, Tc, and Td. After the transfer of the toner images onto the intermediary transfer belt 31, the peripheral surface of each photosensitive drum 11 is cleaned by scraping down the toner (transfer residual toner) which failed to be transferred from the photosensitive drum 11 onto the intermediary transfer belt 31, that is, the toner which is remaining on the photosensitive drum 11, from the photosensitive drum 11 by a cleaning apparatus 15 (15a-15d) disposed on the downstream side of the primary transfer area T (Ta-Td). Through the above described image formation processes, four toner images are sequentially formed of four toners, one for one, on the intermediary transfer belt 31. Among the above described four primary transfer areas Ta-Td, the primary transfer area Ta, which is the most downstream primary transfer area in terms of the advancing (moving) direction of the intermediary transfer belt 31, will be specifically referred to as the most downstream transfer area.

The sheet feeding unit 20 is provided with the following structural components. The first group of structural components is the automatic sheet feeder cassettes 21a and 21b, and a manual sheet feeder tray 27. The sheet feeder unit 20 is also provided with pickup rollers 22a and 22b for sending out transfer mediums P one by one from the sheet feeder cassettes 21a and 21b, respectively, and a pickup roller 26 for sending out transfer mediums P one by one from the manual feeder tray 27. The sheet feeder unit 20 is also provided with three pairs of sheet feeder rollers 23 and a sheet guide 24, which are for conveying the transfer medium P to a pair of registration rollers 25a and 25b after the transfer medium P is sent out by the pickup roller 22a, 22b, or 26. The registration rollers 25a and 25b are for sending out the transfer medium P to the secondary transfer area Te, in synchronism with the image formation timing of the image formation units (stations) a, b, c, and d.

The intermediary transfer unit 30 is provided with the intermediary transfer belt 31, as an intermediary transfer member, which is in the form of an endless belt. The intermediary transfer belt 31 is wrapped around a driver roller 33, a follower roller 32, and a roller 34 (which hereafter may be referred to as backup roller 34) for backing up a secondary transfer roller 36. The driver roller 33 is the roller which transmits driving force to the intermediary transfer belt 31. The follower roller 32 follows the circulatory movement of the intermediary transfer belt 31. The backup roller 34 opposes a secondary transfer roller 36 in the secondary transfer area Te. Designated by a referential code A is the primary transfer plane, which is between the driver roller 33 and follower roller 32. The driver roller 33 is a metallic roller, the peripheral surface of which is coated with a rubber (urethane or chloroprene) layer, which is several millimeter in thickness, to prevent the intermediary transfer belt 31 and driver roller 33 from slipping relative to each other. The driver roller 33 is rotationally driven by a motor, which will be described later. The intermediary transfer belt driving mechanism in this embodiment is set up so that the length of time it takes for the driver roller 33 to fully rotate once is shorter than the length of time it takes for each photosensitive drum to fully rotate once. There are primary transfer charging devices 35a, 35b, 35c, and 35d, which are on the inward side of the loop of the intermediary transfer belt 31, being positioned in the primary transfer areas Ta-Td, in which the intermediary transfer belt 31 opposes the photosensitive drums 11a, 11b, 11c, and 11d, respectively, in such a manner that the charging devices 35a, 35b, 35c, and 35b contact the inward surface of the intermediary transfer belt 31. Further, there is a secondary transfer roller 36, which opposes the aforementioned roller 34 for backing up the intermediary transfer belt 31. The nip which the secondary transfer roller 36 forms between itself and intermediary transfer belt 31 by being placed in contact with the intermediary transfer belt 31 is the secondary transfer area Te. The secondary transfer roller 36 is kept pressed upon the intermediary transfer belt 31 so that a proper amount of pressure is maintained between the secondary transfer belt 36 and intermediary transfer belt 31. Further, the image forming apparatus in this embodiment is provided with a cleaning apparatus 50 for cleaning the image bearing surface of the intermediary transfer belt 31. In terms of the moving direction of the intermediary transfer belt 31, the cleaning apparatus 50 is on the downstream side of the secondary transfer area Te. The cleaning apparatus 50 has: a cleaning blade 51 for removing the transfer residual toner or the like, which is remaining adhered to the image bearing surface of the intermediary transfer belt 31; and a waste toner box 52 for storing the removed transfer residual toner and the like.

The fixation unit 40 is provided with a fixation roller 46 and a pressure roller 47. The fixation roller 46 has an internal heat source 41a, such as a halogen heater. The pressure roller 47 has an internal heat source 41b, and is kept in contact with the fixation roller 46. Further, the image forming apparatus is provided with a guide 43, a pair of inward discharge rollers 44, and a pair of outward discharge rollers 45. The guide 43 is for guiding the transfer medium P to the nip between the fixation roller 46 and pressure roller 47. The inward and outward discharge rollers 44 and 45 are for discharging the transfer medium P out of the main assembly of the image forming apparatus after the transfer medium P is discharged from the nip.

After the transfer medium P is discharged from the fixation unit 40, it is placed on the delivery tray 48.

The controlling means has a control chip 70, a motor drive chip, etc., which are for controlling the operation of the various mechanisms of each of the above described units.

Next, the operation of the above described image forming apparatus will be described.

As an image formation operation start signal is issued, the transfer mediums P are sent out of the sheet feeder cassette 21a one by one by the pickup roller 22a. Then, each transfer medium P is guided to the pair of registration rollers 25a and 25b through the sheet guide 24 by the pairs of feed rollers 23. While the transfer medium P is conveyed to the registration rollers 25a and 25b, the registration rollers 25a and 25b are not rotated, and therefore, the leading edge of the transfer medium P collides with the nip between the registration rollers 25a and 25b. Then, the registration rollers 25a and 25b begin to rotate in synchronism with the timing with which the image formation stations (units) begin to form images. The timing for starting the rotation of the registration rollers 25a and 25b is such that the toner images having just been transferred (primary transfer) onto the intermediary transfer belt 31 from the image formation stations, align with the transfer medium P, in the secondary transfer area Te.

Also as the image formation start signal is issued, the toner image formed on the photosensitive drum 11d, which is the most upstream photosensitive drum 11 in terms of the rotation direction of the intermediary transfer belt 31, is transferred (primary transfer) onto the intermediary transfer belt 31 by the transfer charging device 35d, to which high voltage is being applied. After being transferred (primary transfer) onto the intermediary transfer belt 31 in the transfer area Td, the toner image is conveyed to the transfer area Tc, or the next transfer area. In the image formation station which corresponds to the primary transfer area Tc, an image is being formed later by a length of time which is equal to the length of time it takes for the toner image on the intermediary transfer belt 31 to be conveyed between the two image formation units. Thus, the toner image formed in the second image formation unit is transferred onto the intermediary transfer belt 31 in alignment with the preceding toner image on the intermediary transfer belt 31. The same process is repeated in the third and fourth image formation units. Thus, the four toner images, different in color, are transferred (primary transfer) in layers onto the intermediary transfer belt 31.

Thereafter, the transfer medium P enters the secondary transfer area Te. As the transfer medium P comes into contact with the intermediary transfer belt 31, high voltage is applied to the secondary transfer roller 36 with the same timing as the timing with which the transfer medium P moves through the secondary transfer area Te. Thus, the four toner images, different in color, which have just been transferred onto the intermediary transfer belt 31 through the above described processes, are transferred all together (secondary transfer) onto one of the surfaces of the transfer medium P. Then, the transfer medium P is guided by a conveyance guide 43 to the nip between the fixation roller 46 and pressure roller 47. Then, the transfer medium P is conveyed through the nip. While the transfer medium P is conveyed through the nip, the transfer medium P, and the toner images thereon, are subjected to the heat and pressure from the fixation roller 46 and pressure roller 47. As a result, the toner images become fixed to the surface of the transfer medium P. Thereafter, the transfer medium P is discharged onto the delivery tray 48 by the inward discharge rollers 44 and outward discharge rollers 45.

Next, the driving force transmitting apparatus for transmitting the driving force for rotating the photosensitive drums (objects to be rotated) 11a, 11b, 11c, and 11d, to the photosensitive drums 11, will be described, regarding its structure and operation. Incidentally, in the following description of the driving force transmitting apparatus, the referential codes a, b, c, and d, which differentiate the photosensitive drums 11 in terms of color, will be skipped.

Figure 2:
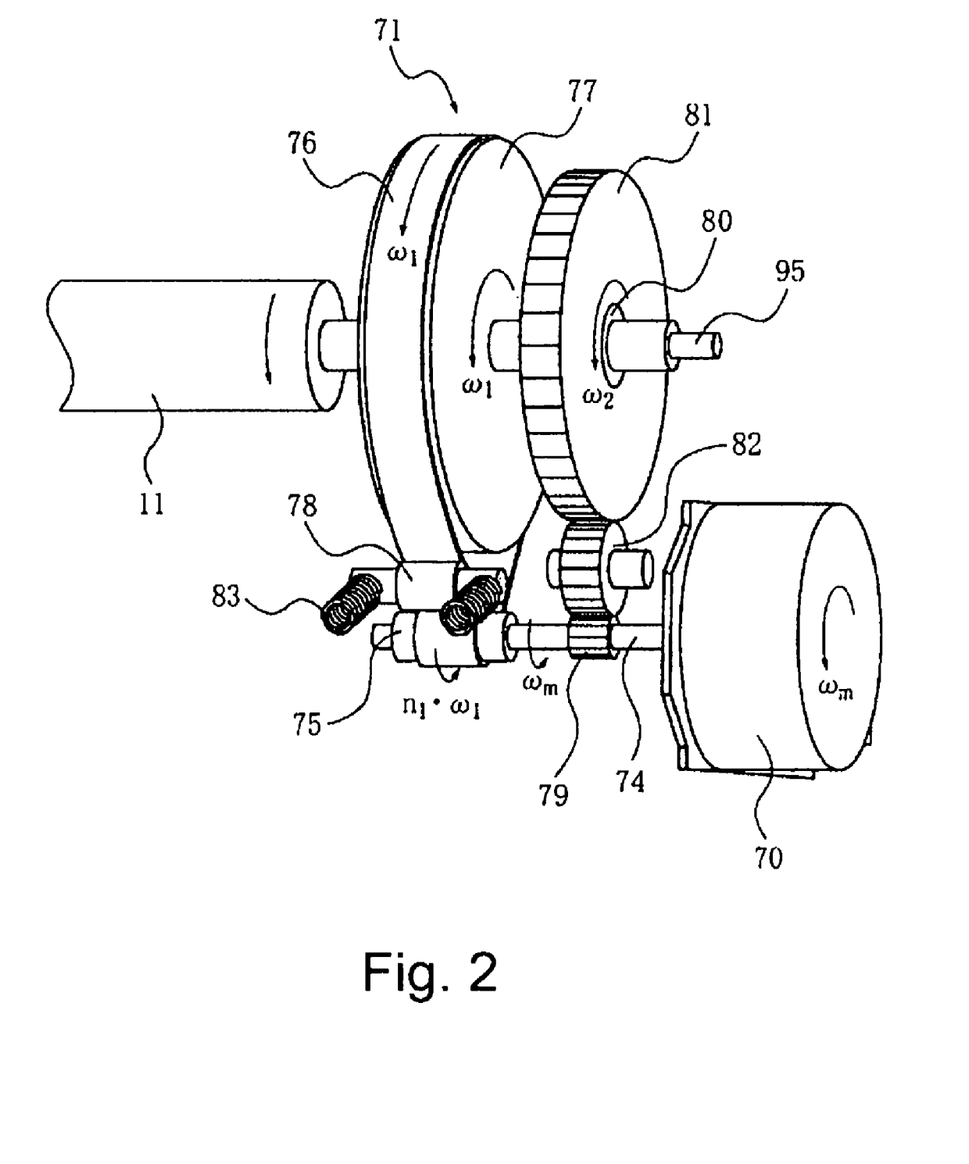
FIG. 2 is a perspective view of the driving force transmitting apparatus (mechanism) of the image forming apparatus in FIG. 1, and is for describing how the driving force is transmitted when the apparatus is in the normal condition.

Referring to FIG. 2, the driving force transmitting apparatus in this embodiment is made up of a photosensitive drum driving motor 70 which is the source of the driving force, and a speed reducing mechanism 71 which transmits the rotational driving force from the motor 70 to the photosensitive drums 11 while reducing the rotational speed.

First, the belt-based portion of the driving force transmitting apparatus (mechanism), which transmits the driving force received from the motor by the driver pulley, to the follower pulley (pulley to be drive) will be described.

The belt-based portion of the driving force transmitting mechanism has an endless metallic belt, which is stretched between the driver pulley 75 and follower pulley 77. As the belt material, stainless steel, nickel, or the like, may be used.

The rotational driving force from the motor 70 is transmitted to the driver puller 70 through the motor shaft 74, and then, is transmitted from the driver pulley 75 to the follower pulley 77 through the steel belt 76 (Hereafter, both driver pulley and follower pulley may be referred to simply as "pulley"). The steel belt 76 is under a proper amount of tension, which is applied to the steel belt 76 by the combination of a tensioner 78 and a tension spring 83. With the provision of this structural arrangement, the driving force is transmitted from the driver pulley 75 to the steel belt 76 by the friction between the surface of the driver pulley 75 and the surface of the steel belt 76, and then, from the steel belt 76 to the follower pulley 77 by the friction between the surface of the steel belt 76 and the surface of the follower pulley 77.

Next, the gear-based portion of the driving force transmitting mechanism, which transmits the driving force received by the driver gear 79 from the driving force source 70, to the follower gear 81, will be described.

Both the driver pulley 75 and driver gear 79 are on the same shaft, which is the shaft 74 of the motor 70. Further, the follower pulley 77 and the follower gear 81 are on the same shaft, which is the driving force transmission shaft 95. Thus, as the follower gear 81 is driven by the driver gear 79 through an idler gear 82, the follower pulley 77 rotates in the same direction as the follower gear 81. It is this idler gear 82 that the driving force received by the driver gear 79 is transmitted to the follower gear 81.

The speed change ratio n1, which is determined by the ratio between the external diameter L1 of the driver pulley 75 and the external diameter L2 of the follower pulley 77, is defined by the following equation:

$$n1 = L2/L1.$$

As for the speed change ratio n2, it is determined by the ratio between the tooth count N1 of the driver gear 79 and the tooth count N2 of the follower gear 81, is defined by the following equation:

$$n2 = N2/N1.$$

In this embodiment, the external diameter of the driver pulley 75, external diameter of the follower pulley 77, tooth count of the driver gear 79, and tooth count of the follower gear 81, are set so that the following inequality is satisfied: n1<n2. That is, the speed change ratio of the speed charge mechanism made up of the driver pulley 75 and follower pulley 77 is smaller than the speed change ratio of the speed changing mechanism made up of the driver gear 79 and follower gear 81.

Next, referring to FIG. 2, the relationship among the number $\omega m$ of the rotations of the motor, number $\omega 1$ of the rotations of the follower pulley 77, and number $\omega 2$ of the rotations of the follower gear 81, when the driving force transmitting mechanism is in the normal condition, that is, when there is no slipping, will be described.

As the motor 70 is rotated at cm, there is the following relationship among the number $\omega 1$ of the rotations of the driver pulley, number of $\omega 2$ of the rotations of the follower pulley, speed change ratio n1 of the driver pulley, and speed change ratio n2 of the driver gear: $n1 \times \omega 1 = n2 \times \omega 2 = \omega m$. Further, there is no slipping between driver pulley 75 and steel belt 76. Therefore, $n1 \times \omega 1 = cm$. Therefore, the rotational speed of the follower pulley 71, and the rotational speed of the steel belt 76, are both $\omega 1$. Therefore, the drum 11 rotates at $\omega 1$.

There is a one-way clutch 80 (which is mechanism for transmitting driving force only in one direction) between the follower gear 81 and driving force transmission shaft 95. The structure of this one-way clutch is such that if the rotational speed $\omega 1$ of the follower pulley 77 is greater than the rotational speed $\omega 2$ of the follower gear 81, that is, if $\omega 1 > \omega 2$, it does not engage. Thus, if the rotational speed $\omega 1$ of the follower pulley 77 is greater than the rotational speed $\omega 2$ of the follower gear 81, the follower gear 81 does not transmit the driving force, and therefore, the components, such as the photosensitive drum 11, which are the objects to be driven, are driven only by the steel belt 76.

Figure 3:
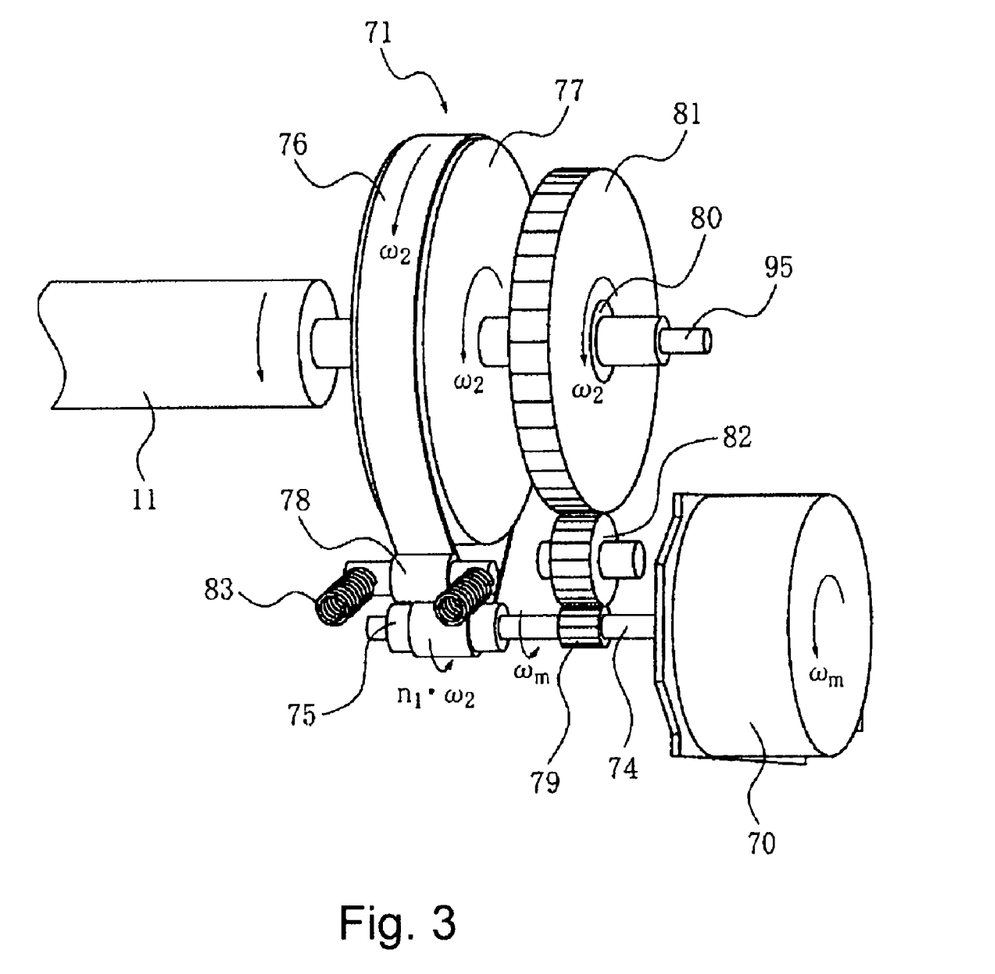
FIG. 3 is a perspective view of the driving force transmitting apparatus (mechanism) of the image forming apparatus in FIG. 1, and is for describing how the driving force is transmitted when the driving belt is slipping.
Figure 4:
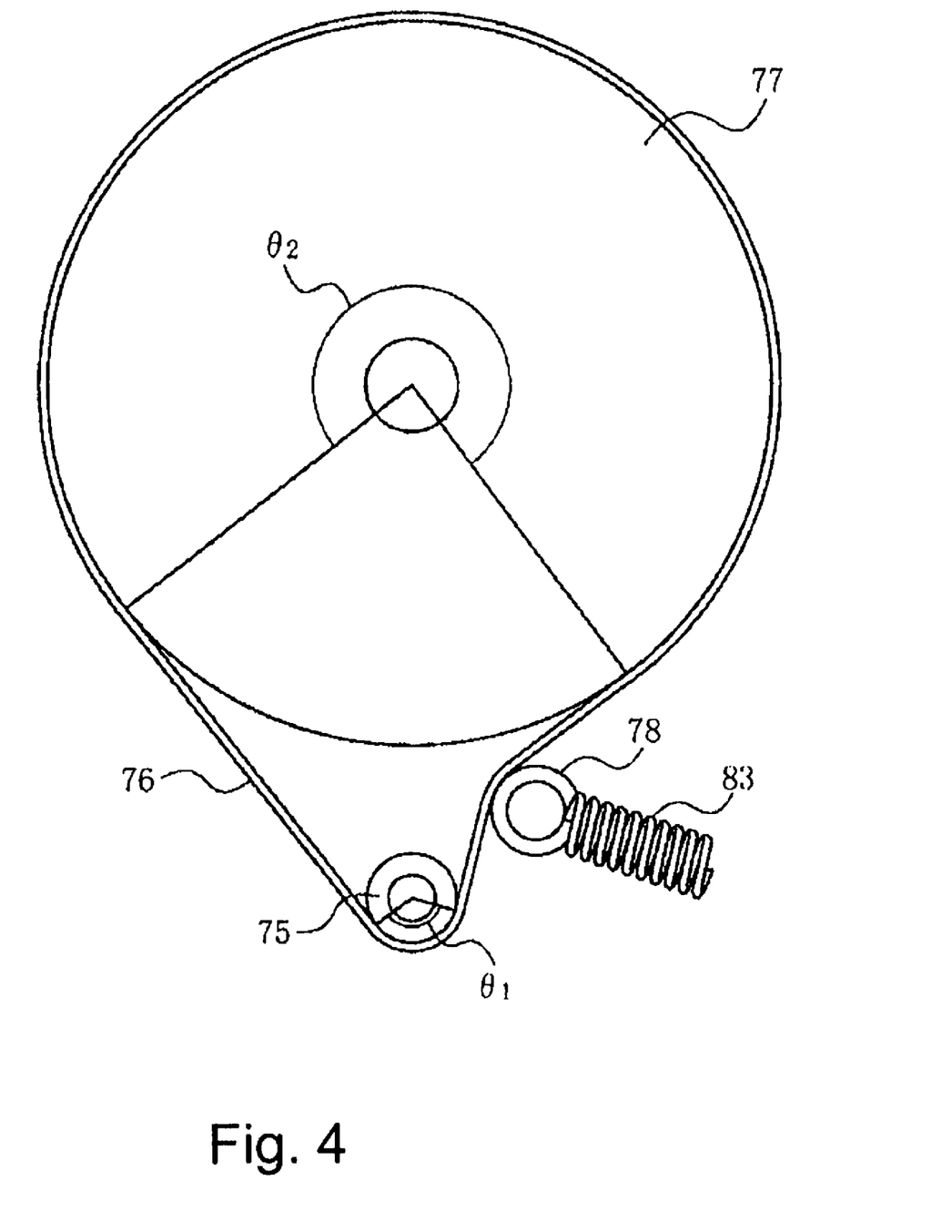
FIG. 4 is a detailed drawing of the belt-based portion of the driving force transmitting apparatus (mechanism) of the image forming apparatus (mechanism) in the first preferred embodiment of the present invention, and is for describing the structure of the belt-based portion.

Next, referring to FIG. 3, the driving operation during the occurrence of the slipping will be described in detail. First, referring to FIG. 4, the structural arrangement for driving the steel belt 76 will be described. FIG. 4 is a side view of the steel belt driving portion of the abovementioned driving apparatus, as seen from the direction of the photosensitive drum 11.

There are various methods thinkable as the methods for suspending a steel belt with two pulleys. Here, however, a relatively simply method will be mentioned as an example. The steel belt 76 is suspended with the driver pulley 75 and follower pulley 77. Then, a tension pulley 78 is positioned on the outward side of the loop of the steel belt 76 in such a manner that the tension pulley 78 is kept pressed upon the steel belt 76 by the tension spring 83, in order to provide the steel belt 76 with tension. Incidentally, the tension may be given to the steel belt 76 from within the steel belt loop. As for the angles θ1 and θ2, by which the steel belt 76 is wrapped around the driver pulley 75 and follower pulley 77, respectively, there is the following relationship: θ1<θ2. Therefore, the slipping is likely to occur on the driver pulley side, which is smaller in the pulley wrapping angle.

Going back to the structural arrangement shown in FIG. 3, a case in which the slipping occurred between the driver pulley 75 and steel belt 76 when the rotational speed of the motor was cm will be described next. While the driver pulley 75 and steel belt 76 are slipping relative to each other, the rotational speed of the steel belt 76 in the driver pulley (75) portion is less than $n1 \times \omega 1$, and therefore, both the rotational speed of the steel belt in the follow pulley (77) portion and the rotational speed of the follower pulley 77 is less than $\omega 1$.

The structure of the one-way clutch 80 is such that the driving force from the follower gear 81 is transmitted to the driving force transmission shaft 95 only when the rotational speed $\omega 1$ of the follower pulley 77 falls below the rotational speed ($\omega 2$) of the follower gear 81. Therefore, if the number $\omega 2$ of the rotations of the follower gear 81 becomes greater than the rotational speed $\omega 1$ of the follower pulley 77 ($\omega 1 < \omega 2$), the one-way clutch 80 locks up, and therefore, the driving force is transmitted only through the gear side.

The follower pulley 77, which is on the same shaft as the follow gear 81, is rotated also at $\omega 2$. Since it is unlikely for the slipping to occur between the follower pulley 77 and steel belt 76, the rotational speed of the steel belt 76 is ω2. Thus, the rotational speed of the steel belt 76 in the driver pulley (75) portion, in which the slipping is occurring, is n1×ω2.

With the provision of the above described structural arrangement, the speed difference which occurs between the driver pulley 75 and steel belt 76 when the driver pulley 75 and steel belt 76 slip relative to each other is minimized. Therefore, the steel belt 76 follows the driver pulley 75. That is, the slipping is controlled. For the purpose of minimizing the loss which occurs from the beginning to the ending of the slipping, it is desired to make as small as possible the value of (n2−n1)/n1, which shows the relationship between the speed change ratio n2 of the gear-based portion of the driving force transmission mechanism, and the speed change ratio n1 of the belt-based portion of the driving force transmission mechanism. Further, it is important to set up the driving force transmission mechanisms so that the relationship in speed between the gear-based portion and belt-based portion is revered by the transmission error when the driving force transmission mechanism is in the normal condition.

The transmission error of the gear-based portion of the driving force transmission mechanism is greater than the pulley-based portion. Generally, it is in a range of 0.1%-1.0%. Therefore, it is recommendable that the driving force transmission mechanism is set up so that the value of ((n2−n1))/n1)×100(%) falls in a range of 0.1%-1.0%, based on the performance of the driving force transmission mechanism.

Next, the relationship among the abovementioned driving speeds will be described quoting the actual values.

It is assumed, as an example, that the rotational speed of the motor is 20 Hz; the speed change ratio n1 of the belt-based portion of the driving force transmission mechanism is 10; and the speed change ratio n2 of the gear-based portion of the driving force transmission mechanism is 10.1. Thus, ((n2−n1)×100=1%.

While no slipping is occurring, the rotational speed of the follower pulley 77 is 2 Hz, and the rotational speed of the follower gear 81 is 1.98 Hz. Therefore, the one-way clutch remains unlocked. In other words, the rotational members are driven by the steel belt 76 alone. That is, the driving force is transmitted by the belt-based portion of the driving force transmission mechanism alone.

Next, the case in which the slipping occurs will be described. It is assumed that the slipping is occurring while the driver pulley 75 is rotating at 20 Hz. As the rotational speed of the steel belt 76 falls below the 19.8 Hz even by a very small amount because of the slipping between the driver pulley 75 and steel belt 76, the rotational speed of the follower pulley 77 also falls below the 1.98 Hz. Thus, the relationship in speed between the follower pulley 77 and follower gear 81 reverses, causing thereby the one-way clutch 80 to lock. Therefore, the driving force begins to be transmitted by the gear-based portion of the driving force transmission mechanism. Consequently, the rotational speed of the follower pulley 77 is maintained at 1.98 Hz, and therefore, the rotational speed of the steel belt 76 around the driver pulley 75 also falls to 19.8 Hz. Therefore, it does not occur that the difference between the speed (20 Hz) of the driver pulley 75 and the speed (19.8 Hz) of the steel belt 76 become larger than 0.2 Hz (=20 Hz-19.8 Hz). That is, the slipping is controlled.

With the employment of the above described structural arrangement, the driving force is transmitted through the gear-based portion of the driving force transmission mechanism even if the slipping occurs in the pulley-based portion of the driving force transmission mechanism. In other words, the slipping is controlled. Therefore, the belt damage attributable to the slipping can be controlled.

Embodiment 2

Figure 5:
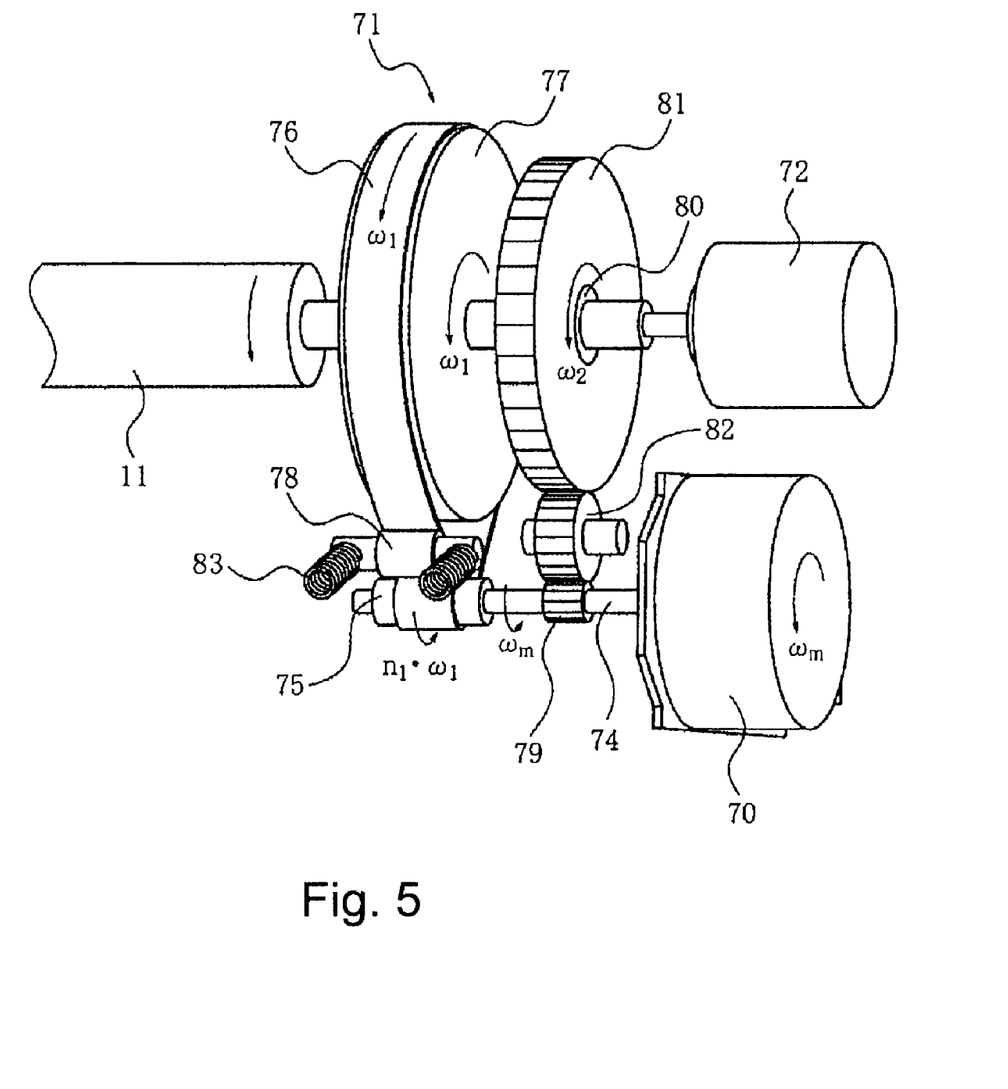
FIG. 5 is a perspective view of the driving force transmitting apparatus (mechanism) of the image forming apparatus in the second preferred embodiment of the present invention, and is for describing the general structure of the apparatus.

Referring to FIG. 5, the image forming apparatus in this embodiment is different in structure from the image forming apparatus in the first preferred embodiment, in that it has an encoder 72 (apparatus for detecting rotational speed) for measuring the rotational speed of the rotational member, and therefore, it is capable of detecting whether or not the image forming apparatus is suffering from the abnormality attributable to the slipping of the belt.

Figure 6:
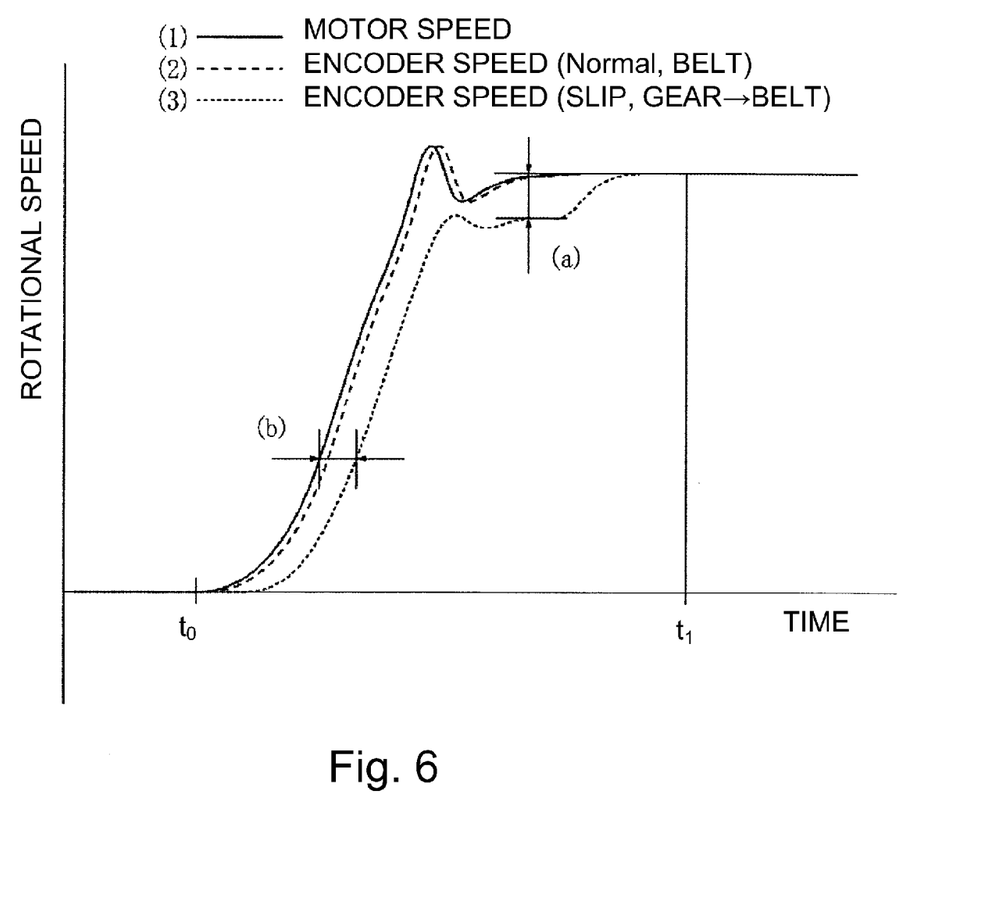
FIG. 6 is a graph for describing the abnormality detecting method in the second preferred embodiment of the present invention.

FIG. 6 is a graph which shows the relationships among (1) rotational speed of the motor, which is obtained by the encoder (unshown) on the shaft of the motor when the motor is started, (2) rotational speed of the shaft of the follower pulley while the driving force is transmitted to the belt without the slipping when the motor is started, and (3) rotational speed of the follower gear while the driving force is transmitted to the follower gear without the slipping when the motor is started. There is a reasonably good match between (1) rotational speed of the motor, and (2) rotational speed of the shaft of the follower pulley when the driving force transmitting mechanism is in the normal condition, whereas there is a difference in waveform between (1) the rotational speed of the motor, and (2) rotational speed of the shaft of the follower pulley when there is the slipping in the driving force transmitting mechanism. This difference is attributable to the following two causes. That is, a difference (a) in FIG. 6 is attributable to the difference between the speed change ratio n1 of the belt-based portion of the driving force transmission mechanism, and the speed change ratio n2 of the gear-based portion of the driving force transmission mechanism. As for a difference (b) in FIG. 6, it is attributable to the difference in responsiveness between the gear-based portion of the driving force transmitting mechanism, which is made of steel gears, and the gear-based portion of the driving force transmitting mechanism, which is made of plastic gears which are less rigid than the steel belt.

This preferred embodiment is based on the above described knowledge. In this embodiment, therefore, whether or not the slipping is occurring is detected based on the difference in the rotational speed between the steel belt-based portion of the driving force transmission mechanism, and the gear-based driving force transmission mechanism when the image forming apparatus is started. There are two methods for comparing the rotational speed of the belt-based portion of the driving force transmission mechanism, and the rotational speed of the gear-based portion of the driving force transmission mechanism. One is the method which compares the rotational speed of the motor with the rotational speed of the follower gear in real time. The second is the method which stores the rotational speed of the follower gear shaft when the image forming apparatus is in the normal condition, and then, compares the stored number with the rotational speed of the follower gear shaft when the slipping is occurring. Which method is to be selected may be determined based on the whether the encoder is on the drive shaft of the motor 70, or whether it is possible to store the number of the rotational speed in the memory. The delay, which occurs as the driving force is transmitted through the gear-based portion of the driving force transmission mechanism while the slipping is occurring, is compensated as the steel belt 76 follows the driver pulley 75.

There are many reasons why the slipping occurs in the driving force transmitting apparatus of an image forming apparatus, and these reasons can be roughly divided into two categories, that is, the category attributable to the abnormalities on the apparatus side, and the category attributable to the temporary increase in load. As the examples of the abnormalities of the apparatus, the adhesion of the scattered toner to the inward surface of the steel belt, adhesion of the scattered toner to the surface of the pulley, and/or the wearing of the steel belt and/or pulleys, can be listed. As for the latter reason, that is, the temporary increase in load, there are a lot of examples. For example, as an image forming apparatus is left unattended for a substantial length of time, the photosensitive drum cleaner, transfer belt cleaner, etc., increase in the amount of load. More specifically, as a cleaner blade, which is made of rubber, is left unused for a substantial length of time, the contact between the cleaner blade and photosensitive drum, or the contact between the cleaner blade and the intermediary transfer member, becomes airtight, which temporarily makes the amount of force necessary to start rotating the photosensitive drum, larger than the ordinary amount. Further, as the image forming apparatus is left unused for a substantial length of time, the recovered transfer residual toner solidifies in the nip between the cleaner blade and rotational member, which increases the amount of force necessary to start rotating the rotational member. Moreover, the similar solidification of toner sometimes occurs across the interface between the photosensitive drum and end seals. Further, in a case where the primary transfer roller, etc., of the intermediary transfer belt portion of an image forming apparatus, are supported with plain bearings, the scattered toner enters the interface between the transfer roller shaft and plain bearings, and solidifies in the interface, which results in the increase in the amount of force necessary to start rotating the primary transfer roller. Further, the causes of the slipping could be in which state of operation an image forming apparatus is. That is, the slipping could occur when the motor is started, or continuously occur while the apparatus is operated. The slipping which occurs when the motor is started is attributable to not only the frictional load of the image forming apparatus, but also, the inertial load. Therefore, the slipping is more likely to occur when the motor is started than when the apparatus is continuously operated.

The above described temporary load increase is an ordinary phenomenon that occurs to an image forming apparatus. Thus, the present invention tolerates this phenomenon. However, it takes the position that the apparatus abnormalities are to be reliably predicted and/or detected. In the past, it was difficult to differentiate the former from the latter. Therefore, in order to prevent the slipping attributable to the temporary load increase, the belt tension, for example, was increased. Therefore, when the slipping occurred because of the increase in the amount of force necessary to rotate the rotational members, the damage to the belt was large. In the case of the driving force transmission mechanism in accordance with the present invention, however, it is structured so that the slipping attributable to the temporary load increase is compensated by the gear-based portion of the driving force transmission mechanism. Therefore, it is unnecessary to increase the belt tension as much as it was in the case of a conventional image forming apparatus. Therefore, in the case of the driving force transmission mechanism in accordance with the present invention, the belt damage which might occur while the mechanism is in the abnormal condition, will be minimum. Further, based on the information such as the timing, frequency, etc., with which the slipping occurred, it is possible to differentiate the apparatus abnormalities from the temporary load increase.

Figure 7:
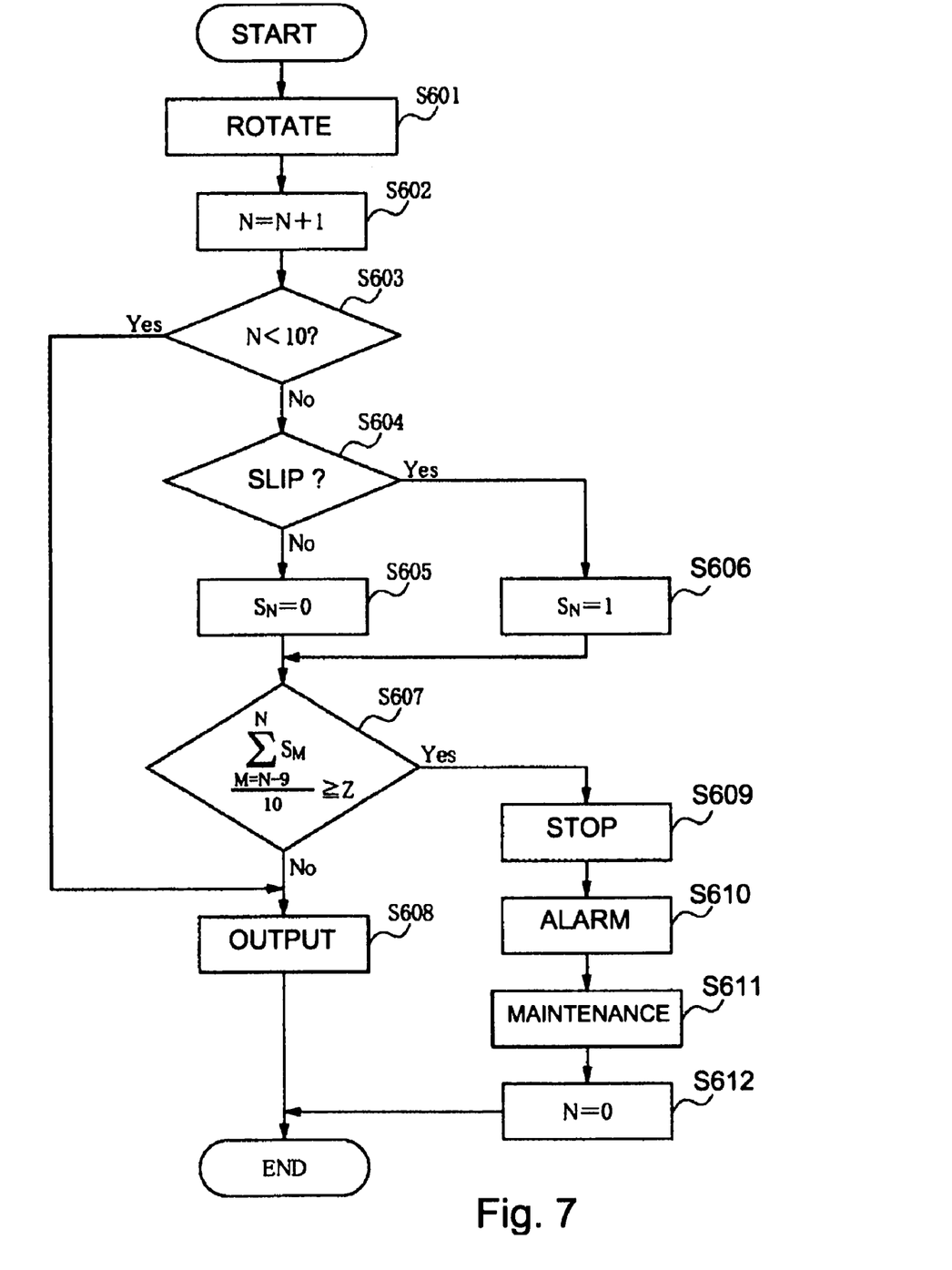
FIG. 7 is the flowchart of the operational sequence for maintaining the driving force transmitting apparatus in the second preferred embodiment of the present invention.
Figure 8:
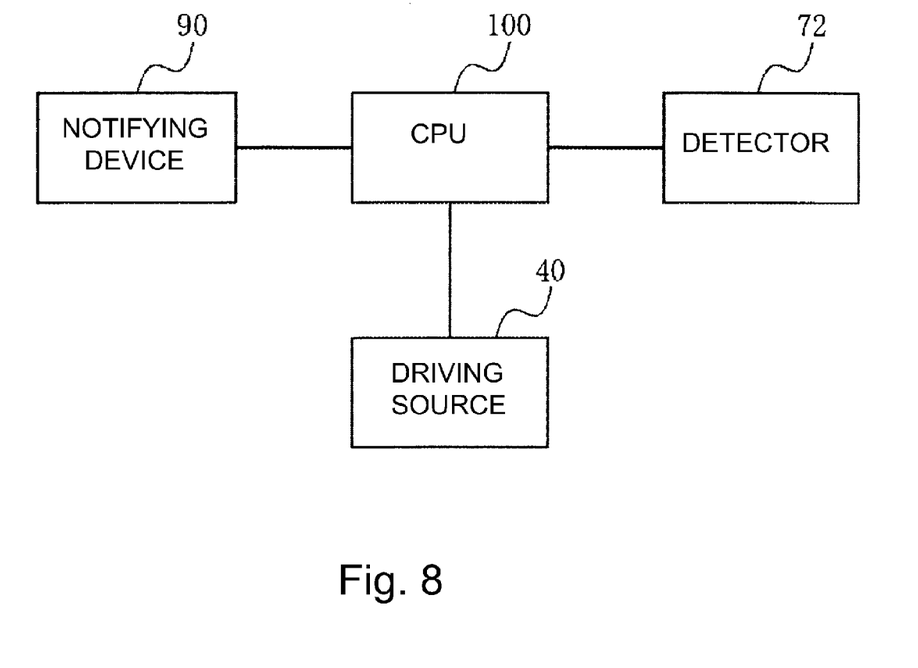
FIG. 8 is a block diagram of the driving force transmitting apparatus checking system in the second preferred embodiment of the present invention.

Next, one of the methods for determining whether or not the image forming apparatus is in the abnormal condition will be described. FIG. 7 is the flowchart of the method. FIG. 8 is the block diagram of the control system of the image forming apparatus in this embodiment.

The information regarding the rotational speed of the driving force transmission shaft 95 is detected by the encoder 72 (rotational speed detecting apparatus), and is transmitted to the control portion 100 (CPU). If it is determined by the control portion 100, based on the results of the detection by the detecting apparatus, that the driving force transmitting apparatus is in the abnormal condition, the abnormalcy of the apparatus is reported by a reporting apparatus 90.

Next, referring to FIG. 7, the sequence in the method for determining whether or not the image forming apparatus is in the abnormal condition will be described.

As a user starts the copying machine, and the driving apparatus begins to rotate in Step S601, one is added to value N in the counter of the apparatus in Step S601 (N is number of times driving apparatus has been turned on/off): initially, N=0).

As long as N is no larger than 10 (Step S603), it is assumed that the driving apparatus is not in the abnormal condition, and images are outputted through the normal operation (Step S608).

On the other hand, if the occurrence of slipping is detected in Step S604 when N is no less than 10, $S_N$ is switched to 1 ($S_N$=1), whereas if the occurrence of slipping is not detected in Step S604, $S_N$ is left as 0 ($S_N$=0).

Then, in Step S607, the ratio with which the slipping occurred during the preceding 10 startup operations was calculated in Step S607. If the ratio is no less than a preset threshold value Z (which was 0.2 in this embodiment), it is determined that the apparatus is in the abnormal condition. Then, the rotation is stopped (Step S609).

As the method for informing a user of the results of the abnormality test, it is possible to alarm the user by displaying the results on a display panel 90 (informing apparatus) of the image forming apparatus, to display the results to a service person through a network or sending a fax to the service person (Step S610).

As soon as the apparatus is normalized by the maintenance operation (Step S611), N is reset to zero (N=0) (Step S612), and the sequence is ended.

The abnormalities in the apparatus condition are discovered through the above described process to prevent the occurrence of serious problems. As long as a detected abnormality or abnormalities are in their early stage, the apparatus can be easily corrected through the ordinary maintenance operation. As for the definition of abnormal apparatus condition in this embodiment, if the ratio with which the slipping occurred during the preceding 10 startup operations is no less than 0.2, it is determined that the apparatus is in the abnormal condition. However, it is not mandatory that the number of startup operations, and slipping ratio, are limited to the above given number (0.2). That is, they may be chosen based on the specifications, condition, etc., of the apparatus.

Embodiment 3

Figure 9:
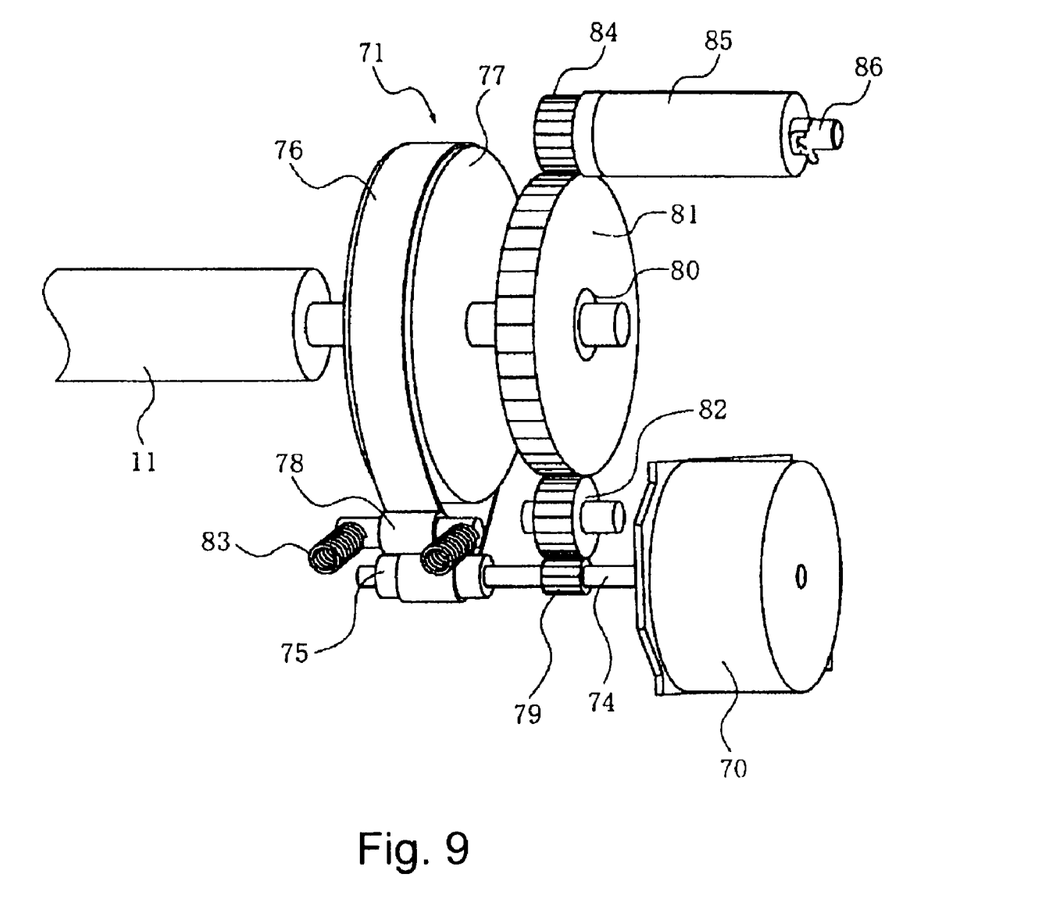
FIG. 9 is a perspective view of the driving force transmitting apparatus (mechanism) of the image forming apparatus in the third preferred embodiment of the present invention, and is for describing the general structure of the apparatus.

In the case of the belt-based portion of the driving force transmitting apparatus, the follower gear 81 was provided with the one-way clutch 80, so that while the driving force transmitting apparatus is in the normal condition, the follower gear remains unlocked from the driving force transmission shaft 95. Therefore, while the driving force transmitting apparatus is in the normal condition, the idler gear 82 and follower gear 81 rotate under virtually no load. Therefore, it is possible that the gears may vibrate, and also, that the gear teeth may collide among themselves and make chattering noises.

In this embodiment, therefore, a rotational load increasing mechanism, which has a brake idler gear 84, a torque limiter 85, and a non-rotational shaft 86, is meshed with the follower gear 81 to provide the follower gear 81 with a certain amount of load. Therefore, the follower gear 81 always remains under the load from the torque limiter 85. Thus, it does not occur that the idler gear 82 and follower gear 81 rotate under no load. Therefore, there is no need for the above described concern. In this embodiment, the torque limiter 85 was used as the load generating means. However, a friction generating member may be disposed so that it can be directly pressed upon one of the lateral surface of the follow gear 81. In other words, any means may be employed in place of the torque limiter 85, as long as the means can provide the load which can control the rotation of the follower gear 81.

In the three embodiments described above, the metallic belt 76 was used as the belt for transmitting the driving force from the driver pulley 75 to the follower pulley 77. However, a belt formed of a resin may be used in place of the metallic belt 76, as long as the belt formed of a resin matches the metallic belt 76 in terms of properties.

Also in the three embodiments of the present invention described above, the present invention was in the form of the driving force transmitting apparatus for transmitting driving force to the photosensitive drum 11. However, a driving force transmitting apparatus similar to the above described ones can be used with the driver roller 33 (member to be rotated) for driving the intermediary transfer belt.

Also in the three embodiments of the present invention described above, the present invention was described with reference to the driving apparatus used for an image forming apparatus. However, the application of the present invention does not need to be limited to the driving apparatus for an image forming apparatus. That is, the present invention is applicable to any apparatus, as long as the apparatus has a portion to be driven.

While the invention has been described with reference to the structures disclosed herein, it is not confined to the details set forth, and this application is intended to cover such modifications or changes as may come within the purposes of the improvements or the scope of the following claims.

This application claims priority from Japanese Patent Application No. 294591/2008 filed Nov. 18, 2008 which is hereby incorporated by reference.

What is claimed is:

1. A drive transmission apparatus for transmitting a driving force to a rotatable member, said drive transmission apparatus comprising:
    a driving source;
    a drive pulley configured to receive a driving force from said driving source;
    a driven pulley;
    a belt, extending around said drive pulley and said driven pulley, configured to transmit the driving force from said drive pulley to said driven pulley;
    a driving gear configured to receive a driving force from said driving source;
    a driven gear configured to receive the driving force of said driving gear;
    a drive transmitting shaft, provided with said driven pulley and said driven gear, configured to transmit the driving force to said rotatable member; and
    a one-way clutch, provided between said driven gear and said drive transmitting shaft, configured to transmit the driving force in a rotational direction from said driven gear to said drive transmitting shaft when an angular speed of said driven pulley is lower than an angular speed of said driven gear.

2. An apparatus according to claim 1, wherein said belt is made of metal.

3. An apparatus according to claim 1, further comprising a detecting device for detecting information relating to a rotational speed of said drive transmitting shaft, and a notification device for notifying an abnormality of said drive transmission apparatus.

4. A drive transmission apparatus for transmitting a driving force to a rotatable member, said drive transmission apparatus comprising:
    a driving source;
    a drive pulley configured to receive a driving force from said driving source;
    a driven pulley;
    a belt, extending around said drive pulley and said driven pulley, configured to transmit the driving force from said drive pulley to said driven pulley;
    a driving gear configured to receive a driving force from said driving source;
    a driven gear configured to receive the driving force of said driving gear;
    a drive transmitting shaft, provided with said driven pulley and said driven gear, configured to transmit the driving force to said rotatable member;
    a drive transmission mechanism, provided between said driven gear and said drive transmitting shaft, configured to transmit the driving force in a rotational direction from said driven gear to said drive transmitting shaft when an angular speed of said driven pulley is lower than an angular speed of said driven gear;
    a detecting device configured to detect information relating to a rotational speed of said drive transmitting shaft; and
    a notification device configured to notify an abnormality of said drive transmission apparatus.

5. An apparatus according to claim 4, wherein said belt is made of metal.

* * * * *